Patented Oct. 25, 1932

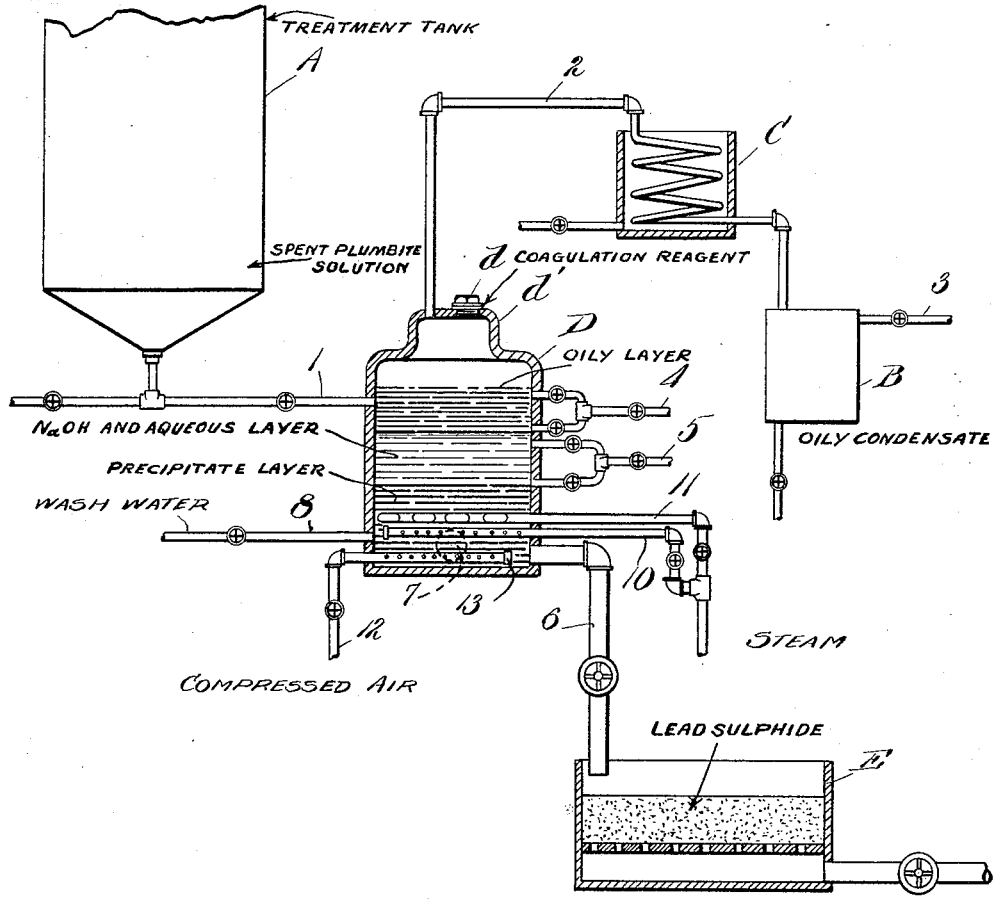

1,883,947

UNITED STATES PATENT OFFICE

ANTHONY KINSEL, OF EVERETT, MASSACHUSETTS, ASSIGNOR TO THE LITHARGE RECOVERY CORPORATION, OF EVERETT, MASSACHUSETTS, A CORPORATION OF MASSACHUSETTS

PROCESS FOR SEPARATING METALLIC-BASE REACTION PRODUCTS FROM OTHER DERIVATIVES IN THE TREATMENT OF HYDROCARBON OILS

Application filed December 26, 1925. Serial No. 77,789.

This invention relates to a process for separating metallic reaction products, for example the lead sulphide produced by a treatment of sulfur-bearing hydrocarbons with a lead compound, from other reaction products, including oily hydrocarbons and aqueous alkaline liquors.

In the refinery treatment of crude hydrocarbons it is good practice to purify the oil or its fractions with the aid of metallic-base reagents. A familiar step in the treatment of sulfur-bearing oils comprises, for example, treatment of a fraction or distillate with sodium plumbite, often called "doctor" solution, by agitation, settling to permit the reagent liquor and contained sulfur compounds and the treated oil, separately to stratify, and decanting off the treated oil.

An object of this invention is to provide a treatment applicable to effect economies in the recovery of values from the reaction products of the oil and metallic base reagents, such as sodium plumbite, for example the values recoverable from the spent separated materials from the reaction on oils with plumbite solution; and particularly to provide a way of causing a rapid and practically complete separation of lead sulphide from the reaction liquor, often referred to as spent plumbite solution, and from oil or tar entrained in the said spent solution. Other metallic base reagents suitable for use according to this invention are compounds such as lead oxide, copper oxide, calcium chloride; nitrates of manganese, cobalt, nickel, copper and iron; copper sulphate, sodium hydroxide and sodium chloride; cupric oxide and the like.

In my Patent No. 1,525,301, dated February 3, 1925, I have described and claimed a process for the regeneration of spent plumbite solution, as an incident of which process the lead sulphide content of the spent plumbite solution is treated with other waste products and otherwise so as ultimately to result in fresh sodium plumbite solution. One advantageous use of my present invention is in the recovery from spent plumbite wastes of lead sulphide in optimum condition for use in the patented process, and another advantage is the coincident recovery of values of hydrocarbon oils in the spent solution, and of alkaline substances capable of use.

The invention will be explained in connection with apparatus shown in the accompanying drawing, in which the view illustrates in diagram a preferred order in which certain steps proceed from a spent plumbite solution to the useful materials separated therefrom.

The reagent treatment of the oil may as usual be carried out in an agitator tank A of any suitable construction (which may be the same tank in which the oil has been treated in usual course with sulfuric acid) from the bottom of which leads a pipe 1 permitting the removal after agitation and settling of the spent plumbite solution, including the amorphous solids or masses resulting from the reaction, and sludges and tars left over from the acid treatment, but now neutralized by the sodium plumbite reagent. The pipe 1 discharges into a preferably closed treatment vessel, still or container D arranged to be heated, which may be of any suitable construction adapted to permit stratification of its contents and having a covered opening $d$ for the introduction of a coagulator reagent, and a vapor dome $d'$ provided with a suitable vapor discharge line 2 to a condenser C and a receiver B for condensed light oil vapors. Receiver B may be provided with an outlet pipe and a valve 3 for drawing off the supernatant layer of recovered light hydrocarbon oils; and may be provided with suitable discharge means for the aqueous fraction of the distillate. The vessel D may be provided with suitable discharge pipes and valves, preferably a pipe 4 for the removal of a supernatant oily layer; a pipe 5 for the removal of an intermediate stratification layer of caustic soda solution, and a pipe 6 for running off the wet lead sulphide precipitate. A manhole and cover 7 may be provided for cleaning out the vessel D into the pipe 6; a water pipe 8 having a nozzle opposite pipe 6 is useful for this purpose.

Steam may be provided to be introduced into the bottom of the vessel D through a perforated steam pipe 10, and a steam heating coil 11 is preferably provided. Pipe 6 may discharge into the filter bed E. Any other heating means may be employed. The material in the vessel D is arranged to be agitated, for example by air jets from a perforated pipe 13 and compressed air line 12.

The treatment recommended to be carried out in vessel D comprises agitation and heating as by the effect of coil 11 and injection of steam and air, respectively, with consequent steam distillation at from 180° to the boiling point at the desired pressure, usually atmospheric, of the light hydrocarbon inclusions in the spent plumbite solution, accompanied by an efficient separation of the oily and tarry inclusions from the precipitated lead sulphide.

The temperature at which the most rapid precipitation of lead sulphide takes place in normal cases is 180° F. When, the cause of an excess of content of gasoline, tar, or other oily distillate adhering to the lead sulphide particles in the material separated from agitator tank A this temperature does not give a satisfactorily rapid separation of lead sulphide, then the temperature may be raised. In some cases it may be desirable even to allow the solution to boil. Treatment with steam for an hour or two is usually satisfactory, but more complete separation of the suspended metallic reaction products occurs if the treatment by heat and agitation is supplemented by the aid of a suitable precipitator or coagulant adapted to group the suspended bodies in larger masses and to release them from suspending emulsoid relation to the aqueous and oily product of the original reaction in agitator tank A. The sediment from the bottom of tank A usually contains a great complexity of tarry and oily organic compounds and polymers of the hydrocarbon oils resulting from the previous acid treatment, and the lead sulphide or other metallic reaction product may be found both in lumps or masses in the sediment in tank A, and in very fine state of division quite capable of being held in suspension in the remaining constituent. So much of the metallic sulphide as is in this fine state is particularly difficult to separate from suspension by filtration, any filter bed efficient for this purpose necessarily being peculiarly liable to clogging by the gummy, tarry and oily bodies by which the finely divided sulphide is held in suspension. Treatment by heat and agitation is found to be effective to cause a state of the mixture in which separation of gross masses or lumps and a gravity separation of the gummy, tarry and oily bodies and the metallic sulphides suspended by them may take place. Centrifugal separation may be resorted to, but ordinarily gravity separation is adequate to separate the released sulphide solids after treatment with heat and steam.

Gravity separation alone, however, while useful, does little to enable the more finely divided metallic salt values to be filtered from their aqueous and residual oily liquid inclusions, and should be accompanied by coagulation treatment whenever a substantial proportion of the separated material from tank A is in emulsoid suspension in the aqueous or oily part of the separated liquid.

In some cases, notably after a previous strong sulfuric acid treatment or in the treatment of heavy distillates the proportion of suspended finely divided lead sulphide, which in some cases is in a colloidal state, is often importantly large, and then the action of heat alone is not sufficient to attain the desired result. In such cases the addition of a suitable coagulant to the hot mixture in tank D is particularly useful, resulting in rapid separation of agglomerated particles of a sufficiently large size to be easily and economically filtered. For example, the addition of 0.2% by weight of ferric sulphate ($Fe_2(SO_4)_3$) is highly effective and recommended; but the coagulant effect may be produced by the addition of soluble salts of many metals; for example, the water-soluble salts of aluminum, magnesium, copper, chromium, iron, cobalt, manganese, nickel and zinc, each of which effects a precipitation of lead sulphide. Recommended procedure comprises adding ferric sulphate solution when the material under treatment reaches a temperature of about 180° F. The amount of ferric sulphate may be varied as circumstances require. Satisfactory performance of coagulation is also obtainable in many cases by the addition of a minor proportion of a suitable acid, organic or inorganic, for example formic acid or sulfuric acid. I am not to be understood, therefore, as restricting the coagulation step of this process to any particular reagent substance, except as specifically claimed.

The recommended application of heat does not vaporize all the organic matters and oily hydrocarbons contained in the spent plumbite solution drawn off from the agitator tank A. After settling in tank D there are usually two supernatant strata of liquid above the lead sulphide precipitate. The upper stratum contains polymers and tarry substances and oily hydrocarbons of higher boiling points than the distillate; and the intermediate layer predominantly is an aqueous solution of caustic soda. The liquid layers above the lead sulphide may respectively be drawn off through pipes 4 and 5, and the lead sulphide precipitate is then delivered to filter E, where it may be washed to remove the remaining caustic soda solution. The aqueous alkaline separated liquor from tank D may be concentrated, filtered, and purified, or used again, for example as explained in my said Patent No. 1,525,301.

The precipitated metallic salt, such as the lead sulphide, is left in the filter E in optimum condition for the regeneration of the metallic base reagent by procedure in accordance with my said patent, for example.

The upper stratum in tank D after treatment and settling contains values in high-boiling oils which may be recovered by any usual refinement steps.

Where the distillate formed in the steam treatment is herein mentioned, it will be understood that the fraction distilling over may be a binary or ternary mixture with water vapors having an effective boiling point lower than that of any of its constituents.

I claim:

1. Process for separating metallic-base reaction products from other derivatives of the treatment of hydrocarbon oils comprising subjecting the reaction liquor from the treatment of oily material with a metallic-base reagent to heat and agitation, settling and recovering the metallic-base precipitate from the settled mixture.

2. Process for separating metallic-base reaction products from other derivatives of the treatment of hydrocarbon oils comprising subjecting the reaction liquor from the treatment of oily material with a metallic-base reagent to heat and agitation in the presence of water vapor, permitting stratification of the resultant mixture into a precipitate, an aqueous stratum and an oily stratum, decanting off these separated materials, and removing the precipitate.

3. Process for the recovery of values from spent sodium plumbite solution after reaction with sulfur-bearing hydrocarbon oils comprising stratification and separation of the spent solution and the treated oil, agitating the spent solution with the aid of heat and with the aid of a coagulating substance, separating in accordance with their specific gravities the oily contents, the aqueous alkaline contents, and the lead sulphide contents of the solution.

4. Process for the recovery of values from spent sodium plumbite solution after reaction with sulfur-bearing hydrocarbon oils comprising stratification and separation of the spent solution and the treated oil, agitating the spent solution at a temperature of from 180° to 200° F. in a suitable vessel, permitting the lead sulphide precipitate to settle, and separating the lead sulphide from entrained liquor by filtration.

5. Process for the recovery of values from spent sodium plumbite solution after reaction with sulfur-bearing hydrocarbon oils comprising causing stratification and separation of the spent solution and the treated oil by agitating the spent solution with steam in a suitable vessel, whereby collecting and condensing light oil vapors released by this treatment is made possible, causing the residue to stratify, and separating the precipitated lead sulphide from the liquids entrained therein.

6. Process for separating the various constituents of spent plumbite solution comprising distilling off with the aid of steam and agitation light hydrocarbons and effecting the stratification of and separation of the remainder of said constituents prepared for such stratification by agitation with steam.

7. Process for the separate recovery of values in spent reagent liquors of the reaction between hydrocarbon oils and desulphurizing metallic-base reagents comprising as steps subjecting the reagent liquor to the action of a coagulant substance effective in relation to the sulfur compounds of the metallic-base of the desulfurizing reagent, and separating the coagulated precipitate from the remaining constituents.

8. Process for the separate recovery of values in spent reagent liquors of the reaction between hydrocarbon oils and desulfurizing metallic-base reagents comprising as steps subjecting the reagent liquor to heat and to the action of a water-soluble metallic salt coagulant effective in relation to the sulfur compounds of the metallic-base of the desulfurizing reagent, and separating the coagulated precipitate from the remaining constituents.

9. Process for the separate recovery of values in spent reagent liquors of the reaction between hydrocarbon oils and desulfurizing metallic-base reagents comprising as steps subjecting the reagent liquor to heat and to the action of a water-soluble metallic salt coagulent effective in relation to the sulfur compounds of the metallic-base of the desulfurizing reagent, and separating the coagulated precipitate from the remaining constituents.

10. Process for the recovery as lead sulphide in agglomerated particles capable of ready separation by filtration of the reaction products of sodium plumbite and sulphur-bearing hydrocarbon oils, comprising treating the spent reaction liquor after separation by decantation from the treated oil with the aid of heat in the presence of a water-soluble salt of iron, and collecting and removing the lead sulphide precipitate by filtration.

11. Steps in the recovery of lead sulphide from inclusion in spent plumbite solution following treatment of sulfur-bearing hydrocarbon oils for the removal of sulfur compounds, comprising heating, and adding to the spent plumbite solution while hot, a reagent substance adapted to effect conglomeration and precipitation of finely divided lead sulphide held in suspension in the liquid contents.

12. Steps in the recovery of lead sulphide from inclusion in spent plumbite solution following treatment of sulfur-bearing hydrocarbon oils for the removal of sulfur compounds, comprising heating, and adding to the spent plumbite solution while hot a sufficient quantity of ferric sulfate to effect conglomeration and release from suspension of finely divided lead sulphide.

13. Process for separating the reaction products of sodium plumbite solution and the sulphur contents of the oil from other derivatives of the treatment of hydrocarbon oils with sodium plumbite solution comprising, subjecting the reaction products from the treatment with said solution to heat and agitation, settling and recovering the lead-base precipitate from the settled mixture.

14. Process for separating the reaction products of sodium plumbite solution and the sulphur contents of the oil from other derivatives of the treatment of hydrocarbon oils with sodium plumbite solution comprising, subjecting the reaction products from the treatment with said solution to heat and agitation in the presence of water vapor, permitting stratification of the resultant mixture into a precipitate, an aqueous stratum and an oily stratum, decanting off these separated materials, and removing the precipitate.

15. Process for separating metallic base reaction products from other derivatives of the treatment of hydrocarbon oil with an aqueous solution of a metallic base reagent, comprising heating the mixture of aqueous, oily, and metallic base reaction products to a temperature at which oily compounds adhering to the metallic base reaction products are separated therefrom and at which the lower boiling oily compounds are distilled, collecting the resulting distillate, discontinuing the heating, permitting the mixture to settle, whereby the undistilled oily material collects as an upper layer, the aqueous material collects as an intermediate layer, and the metallic base reaction products, separated from the oily material which would otherwise cause them to remain in suspension, are precipitated as a bottom layer, separately withdrawing the three layers, and recovering the metallic base precipitate for further use.

16. Method according to claim 15, in which the metallic base reagent is sodium plumbite solution.

Signed by me at Boston, Massachusetts, this seventeenth day of December, 1925.

ANTHONY KINSEL.